(12) United States Patent
Luo

(10) Patent No.: US 9,992,141 B2
(45) Date of Patent: Jun. 5, 2018

(54) USER INFORMATION CLASSIFICATION METHOD AND APPARATUS, AND USER GROUP INFORMATION ACQUISITION METHOD AND APPARATUS

(71) Applicant: Alibaba Group Holding Limited, Grand Cayman (KY)

(72) Inventor: Xiaoxia Luo, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 778 days.

(21) Appl. No.: 14/523,779

(22) Filed: Oct. 24, 2014

(65) Prior Publication Data
US 2015/0120653 A1 Apr. 30, 2015

(30) Foreign Application Priority Data
Oct. 28, 2013 (CN) .......................... 2013 1 0516904

(51) Int. Cl.
*H04L 12/58* (2006.01)
*G06F 17/30* (2006.01)

(52) U.S. Cl.
CPC ........ *H04L 51/04* (2013.01); *G06F 17/30705* (2013.01); *H04L 51/16* (2013.01)

(58) Field of Classification Search
CPC ...................................... H04L 51/04
USPC .......................................... 709/206
See application file for complete search history.

(56) References Cited

U.S. PATENT DOCUMENTS

| 6,480,885 B1 | 11/2002 | Olivier |
| 7,729,481 B2 | 6/2010 | Thompson et al. |
| 7,885,901 B2 | 2/2011 | Hull et al. |
| 8,010,602 B2 | 8/2011 | Shen et al. |
| 8,271,600 B2 | 9/2012 | Herold et al. |
| 8,364,770 B2 | 1/2013 | Ladouceur et al. |
| 8,605,882 B1 | 12/2013 | Abuelsaad et al. |
| 2003/0204720 A1 | 10/2003 | Schoen et al. |

(Continued)

OTHER PUBLICATIONS

PCT Search Report and Written Opinion dated Apr. 22, 2015 for PCT Application No. PCT/US14/62279, 9 Pages.

*Primary Examiner* — David Lazaro
*Assistant Examiner* — Zia Khurshid
(74) *Attorney, Agent, or Firm* — Lee & Hayes, PLLC

(57) ABSTRACT

Methods and apparatuses of classifying user information and obtaining user group information, which mainly include: obtaining, by an instant messaging server, an entity data unit posted by a first user from a target database; matching conversation information generated between a second user and the first user through an instant messaging client with the entity data unit; and determining user group information of the first user to which user information of the second user corresponding to the conversation information belongs based on a matching result, where the user group information of the first user is determined according to attribute information and/or name information of the entity data unit posted by the first user. As such, for a first user using an instant messaging client, not only the approach of managing the user information of a second user by the first user is improved, but also commodity information can be pushed to the second user in a targeted manner according to a group to which the second user belongs, thereby improving efficiency of releasing the commodity information.

20 Claims, 8 Drawing Sheets

(56) References Cited

U.S. PATENT DOCUMENTS

| | | | |
|---|---|---|---|
| 2005/0055450 A1* | 3/2005 | Gang | G06F 17/30867 709/228 |
| 2006/0085752 A1 | 4/2006 | Beadle et al. | |
| 2008/0137671 A1 | 6/2008 | Agarwal et al. | |
| 2009/0138828 A1* | 5/2009 | Schultz | G06Q 10/10 715/853 |
| 2010/0146065 A1 | 6/2010 | Zhu et al. | |
| 2012/0260188 A1 | 10/2012 | Park et al. | |
| 2013/0238737 A1 | 9/2013 | Davidson et al. | |

* cited by examiner

USER INFORMATION CLASSIFICATION METHOD AND APPARATUS, AND USER GROUP INFORMATION ACQUISITION METHOD AND APPARATUS

CROSS REFERENCE TO RELATED PATENT APPLICATION

This application claims foreign priority to Chinese Patent Application No. 201310516904.5 filed on Oct. 28, 2013, entitled "User Information Classification Method and Apparatus, and User Group Information Acquisition Method and Apparatus", which is hereby incorporated by reference in its entirety.

TECHNICAL FIELD

The present disclosure relates to the field of Internet data processing, and more particularly to methods and apparatuses of classifying user information, and methods and apparatuses of obtaining user group information.

BACKGROUND

With the continuous development of the Internet technologies, different varieties of instant messaging software emerge in a large amount, and people communicate with each other using the instant messaging software, which brings great convenience to production and lives.

However, as the number of users using the instant messaging software increases, each user may communicate with multiple different users through an instant messaging client, and locally store user information of these multiple different users. The user information includes an instant messaging account (if the instant messaging software is Tencent QQ, the user information corresponds to a QQ number of a user; or if the instant messaging software is Aliwangwang, the user information corresponds to an Aliwangwang account of the user).

However, among multiple different users communicating with a user A, the user divides user information of the multiple users who communicate therewith into groups according to relationships between the user and communication objects. Generally, two types of groups are included, namely, a "friend" type and a "stranger" type. For example, user information corresponding to a user who is known in real life is set as the "friend" type, user information corresponding to a user who has communicated therewith through the Internet is set as the "friend" type, and user information corresponding to a user who is added automatically through the Internet is set as the "stranger" type. As can be seen, user information of the "friend" type is implemented through manual operations of the user. As such, the user can conveniently communicate with other users using an instant messaging client.

With the development of e-commerce business, the number of users who open online stores in the Internet has increased. A user who opens an online store also communicates with a client using instant messaging software. However, a user who opens an online store is not able to determine a relationship with a client with whom the user communicates in time, leading to a rapid increase in the amount of user information of clients belonging to the "stranger" type associated with the user who opens the online store. Furthermore, as user information that is used by people for registration in the Internet is set up casually, user information of corresponding clients cannot be classified by using the user information.

The rapid increase in the amount of user information of clients belonging to the "stranger" type not only increases the difficulty of managing user information in instant messaging software for a user who opens an online store, but also forces the user who opens the online store to promulgate commodity information thereof to every potential client in a potential client group (that is, user information of clients of the "stranger" type), which not only wastes system resources but also leads to a low efficiency of promulgating the commodity information, thus failing to satisfy the needs of the user who opens the online store to promulgate the information.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present disclosure provide a method and an apparatus of classifying user information, and a method and an apparatus of obtaining user group information in order to solve the problems of great difficulty of managing user information and low efficiency of posting commodity information due to a relatively large volume of user information of clients corresponding to a "stranger" type of users.

A method of classifying user information includes:

obtaining, by an instant messaging server, an entity data unit that is posted by a first user and is stored in a target database;

matching conversation information generated between a second user and the first user through an instant messaging client with the entity data unit; and determining user group information of the first user to which user information of the second user corresponding to the conversation information belongs based on a matching result, wherein the user group information of the first user is determined based on attribute information and/or name information of the entity data unit that is posted by the first user.

Prior to the instant messaging server obtaining the entity data unit that is posted by the first user and is stored in the target database, the method further includes:

receiving, by the instant messaging server, a login request message from the first user, wherein the login request message includes user information of the first user;

performing validity check on the user information of the first user, and when the check is successfully passed, sending a synchronization request message of the entity data unit to the target database, wherein the synchronization request message includes the user information of the first user; and receiving a synchronization response message that is returned from the target database, wherein the synchronization response message is used for indicating whether the entity data unit posted by the first user is updated.

Obtaining the entity data unit further includes: each time when the first user logs into the instant messaging server, obtaining the entity data unit that is posted by the first user in the target database synchronously, which provides a basis for subsequent classification of the user information of the second user.

Obtaining, by the instant messaging server, the entity data unit that is posted by the first user and is stored in the target database, includes:

determining whether the synchronization response message includes an updated entity data unit; and when a determination result indicates that the synchronization response message includes the updated entity data unit, receiving the updated entity data unit; or when the determination result indicates that the synchronization response message does not include the updated entity data unit, reading the entity data unit that is posted by the first user from a local cache.

After obtaining the entity data unit that is posted by the first user, the method further includes:

based on the obtained entity data unit that is posted by the first user, parsing the entity data unit to determine the attribute information and/or the name information of the entity data unit.

Since a time period within which the first user posts the entity data unit is different from a time period within which the first user logs into the instant messaging server, this means that the entity data unit that is posted by the first user may be an updated entity data unit, or may be an entity data unit that has not been updated. By determining and obtaining the entity data unit through different means in time, synchronization between the obtained entity data unit and the entity data unit that is posted by the first user can be ensured.

Determining the user group information based on the attribute information and/or the name information of the entity data unit that is posted by the first user, includes:

after obtaining the entity data unit that is posted by the first user, establishing a correspondence relationship between the user information of the first user and the attribute information of the entity data unit, and determining the user group information of the first user based on the attribute information of the entity data unit; and/or after obtaining the entity data unit that is posted by the first user, establishing a correspondence relationship between the user information of the first user and the name information of the entity data unit, and determining the user group information of the first user based on the name information of the entity data unit.

The determination of the correspondence relationship between the entity data unit and the user group information of the first user helps to classify the user information of the second user, and improves the efficiency of managing the user information of the second user by the first user.

Matching the conversation information generated between the second user and the first user through the instant messaging client with the entity data unit, includes:

obtaining the conversation information generated between the second user and the first user through the instant messaging client;

determining whether the conversation information includes the attribute information and/or the name information of the entity data unit corresponding to the user information of the first user; and when a determination result indicates that the conversation information includes the attribute information and/or the name information of the entity data unit corresponding to the user information of the first user, establishing a correspondence relationship between the user information of the second user corresponding to the conversation information and the attribute information and/or the name information of the entity data unit corresponding to the user information of the first user.

A manner of classifying the user information of the second user who communicates with the first user is further limited.

Determining the user group information of the first user to which the user information of the second user corresponding to the conversation information belongs based on the matching result, includes:

based the established correspondence relationship between the user information of the second user corresponding to the conversation information and the attribute information and/or the name information of the entity data unit corresponding to the user information of the first user, determining attribute information and/or name information corresponding to the user information of the second user;

searching for the user group information corresponding to the attribute information and/or the name information of the first user based on the determined attribute information and/or the determined name information; and upon finding the user group information corresponding to the attribute information and/or the name information of the first user, determining an association relationship between the user information of the second user and the found user group information of the first user.

The method further includes:

if the user group information corresponding to the attribute information and/or the name information of the first user is not found, generating the user group information of the first user based on the attribute information and/or the name information; and determining the user group information of the first user to which the user information of the second user corresponding to the conversation information belongs, includes:

determining an association relationship between the user information of the second user corresponding to the conversation information and the generated user group information of the first user.

After determining the association relationship between the user information of the second user and the user group information of the first user, the method further includes:

loading the user information of the second user into a group corresponding to the user group information of the first user.

A method of obtaining user group information includes:

obtaining, by an instant messaging server, an entity data unit that is posted by a first user and is stored in a target database;

determining attribute information and/or name information of the entity data unit that is posted by the first user; and generating user group information that corresponds to the attribute information of the first user based on the determined attribute information of the entity data unit; and/or generating user group information that corresponds to the name information of the first user based on the determined name information of the entity data unit.

After generating the user group information of the first user, the method further includes:

establishing a correspondence relationship between the attribute information of the entity data unit, the user group information that corresponds to the attribute information of the first user, and user information of the first user; and establishing a correspondence relationship between the name information of the entity data unit, the user group information that corresponds to the name information of the first user, and the user information of the first user.

An apparatus of classifying user information includes:

an acquisition module used for obtaining an entity data unit that is posted by a first user and is stored in a target database;

a matching module used for matching conversation information generated between a second user and the first user through an instant messaging client with the entity data unit; and a classification module used for determining user group information of the first user to which user information of the second user corresponding to conversation information belongs based on a matching result, wherein the user group information of the first user is determined according to attribute information and/or name information of the entity data unit that is posted by the first user.

The apparatus further includes a synchronization module, wherein the synchronization module is used for receiving a login request message from the first user, the login request message including user information of the first user; sending a synchronization request message of the entity data unit to the target database after a validity check on the user information of the first user is performed and the check is successfully passed, wherein the synchronization request message includes the user information of the first user; and receiving a synchronization response message that is returned from the target database, wherein the synchronization response message is used for indicating whether the entity data unit that is posted by the first user is updated.

The acquisition module is used for determining whether the synchronization response message includes an updated entity data unit; and receiving the updated entity data unit when a determination result indicates that the synchronization response message includes the updated entity data unit; or reading the entity data unit that is posted by the first user from a local cache when the determination result indicates that the synchronization response message does not includes the updated entity data unit.

The apparatus further includes a parsing module, wherein the parsing module is used for parsing the entity data unit based on the obtained entity data unit that is posted by the first user upon obtaining the entity data unit that is posted by the first user to determine the attribute information and/or the name information of the entity data unit.

The apparatus further includes a storage module, wherein the storage module is used for locally storing the received updated entity data unit after the received updated entity data unit is parsed.

Determining the user group information based on the attribute information and/or the name information of the entity data unit that is posted by the first user, includes:

after obtaining the entity data unit that is posted by the first user, establishing a correspondence relationship between the user information of the first user and the attribute information of the entity data unit, and determining the user group information of the first user based on the attribute information of the entity data unit; and/or after obtaining the entity data unit that is posted by the first user, establishing a correspondence relationship between the user information of the first user and the name information of the entity data unit, and determining the user group information of the first user based on the name information of the entity data unit.

The matching module is used for obtaining the conversation information generated between the second user and the first user using the instant messaging client; determining whether the conversation information includes the attribute information and/or the name information of the entity data unit corresponding to the user information of the first user; and when a determination result indicates that the conversation information includes the attribute information and/or the name information of the entity data unit corresponding to the user information of the first user, establishing a correspondence relationship between the user information of the second user corresponding to the conversation information and the attribute information and/or the name information of the entity data unit corresponding to the user information of the first user.

The classification module is used for determining attribute information and/or name information corresponding to the user information of the second user based on the established correspondence relationship between the user information of the second user corresponding to the conversation information and the attribute information and/or the name information of the entity data unit corresponding to the user information of the first user; searching for the user group information that corresponds to the attribute information and/or the name information of the first user based on the determined attribute information and/or the determined name information; and upon finding the user group information that corresponds to the attribute information and/or the name information of the first user, determining an association relationship between the user information of the second user and the found user group information of the first user.

The classification module is further used for generating the user group information of the first user based on the attribute information and/or the name information when the user group information that corresponds to the attribute information and/or the name information of the first user is not found; and determining an association relationship between the user information of the second user corresponding to the conversation information and the generated user group information of the first user.

The apparatus further includes a loading module, wherein the loading module is used for loading the user information of the second user into a group corresponding to the user group information of the first user after the association relationship between the user information of the second user and the user group information of the first user is determined.

An apparatus of obtaining user group information includes:

an acquisition module used for obtaining an entity data unit that is posted by a first user and is stored in a target database;

a determination module used for determining attribute information and/or name information of the entity data unit that is posted by the first user; and a user group information generation module used for generating user group information that corresponds to the attribute information of the first user based on the determined attribute information of the entity data unit; and/or generating user group information that corresponds to the name information of the first user based on the determined name information of the entity data unit.

The apparatus further includes a relationship establishment module, wherein the relationship establishment module is used for establishing a correspondence relationship between the attribute information of the entity data unit, the user group information that corresponds to the attribute information of the first user, and user information of the first user; and establishing a correspondence relationship between the name information of the entity data unit, the user group information that corresponds to the name information of the first user, and the user information of the first user.

Beneficial effects of the present disclosure include the following:

In the embodiments of the present disclosure, an instant messaging server obtains an entity data unit that is posted by a first user and is stored in a target database, matches conversation information generated between a second user and the first user through an instant messaging client with the entity data unit, and determines user group information of the first user to which user information of the second user corresponding to the conversation information belongs based on a matching result, wherein the user group information of the first user is determined based on attribute information and/or name information of the entity data unit that is posted by the first user. As such, for the first user using the instant messaging client, after the first user logs into the instant messaging server, the instant messaging server obtains the entity data unit that is posted by the first user from the target database based on login information of the first user, and determines a degree of concern of the second user with respect to the entity data unit that is posted by the first user through a degree of matching of the conversation information generated between the second user and the first user through the instant messaging client with the entity data unit that is posted by the first user. Performing grouping for the user information of the second user using the degree of concern, which not only improves the approach of managing the user information of the second user by the first user, but also promotes commodity information to the second user in a targeted manner based on a group to which the second user belongs, thereby improving the efficiency of promulgating the commodity information.

DETAILED DESCRIPTION

Figure 1:
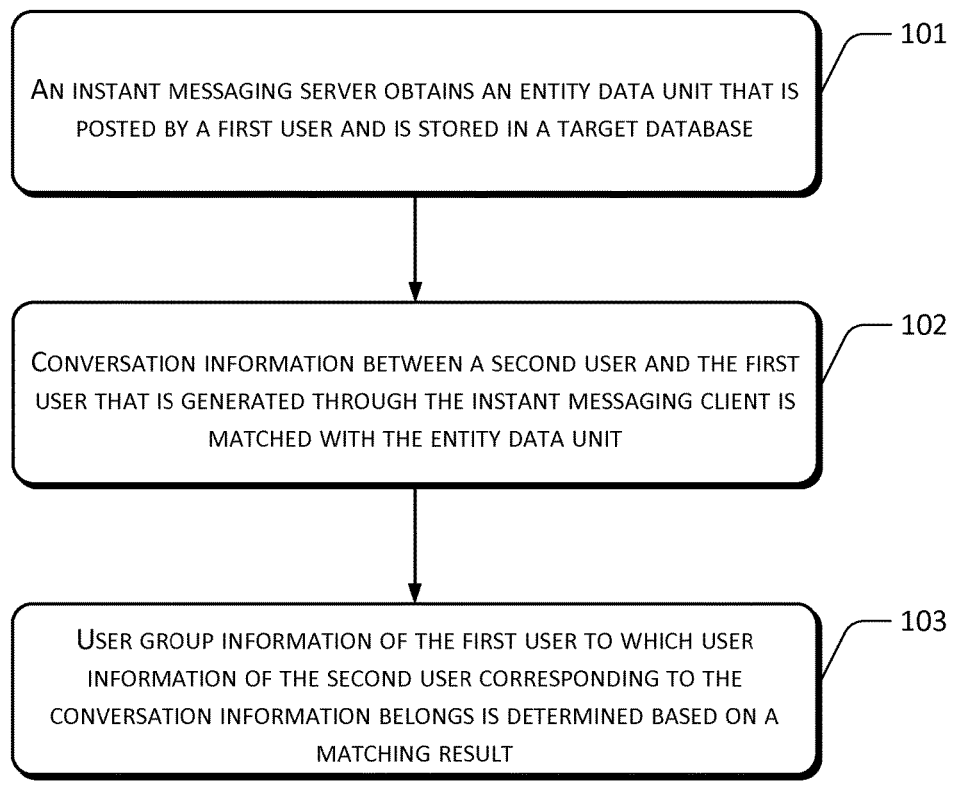
FIG. 1 is a flowchart illustrating a method of classifying user information in accordance with a first embodiment of the present disclosure.

In order to achieve objectives of the present disclosure, embodiments of the present disclosure provide a method and an apparatus of classifying user information, where an instant messaging server obtains an entity data unit that is posted by a first user and is stored in a target database, matches conversation information between a second user and the first user that is generated through an instant messaging client with the entity data unit, and determines user group information of the first user to which user information of the second user corresponding to the conversation information belongs based on a matching result, wherein the user group information of the first user is determined based on attribute information and/or name information of the entity data unit that is posted by the first user. As such, for the first user using the instant messaging client, after the first user logs into the instant messaging server, the instant messaging server obtains the entity data unit that is posted by the first user from the target database based on login information of the first user, and determines a degree of concern associated with the second user with respect to the entity data unit that is posted by the first user through a degree of matching of the conversation information between the second user and the first user that is generated through the instant messaging client to the entity data unit that is posted by the first user. Performing grouping for the user information of the second user using the degree of concern, which not only improves the approach of managing the user information of the second user by the first user, but also promotes commodity information to the second user in a targeted manner based on a group to which the second user belongs, thereby improving the efficiency of promulgating the commodity information.

It should be noted that an entity implementing the embodiments of the present disclosure includes, but is not limited to, an instant messaging server, and alternatively may be a third-party apparatus other than the instant messaging server. No limitation thereon is imposed herein.

An instant messaging client involved in the embodiments of the present disclosure includes, but is not limited to, an instant messaging client of Aliwangwang, an instant messaging client of QQ, and an instant messaging client of WeChat, etc. Any application software having an instant messaging function can be applicable in the present disclosure. No limitation thereon is imposed herein.

A target database involved in the embodiments of the present disclosure refers to a database for which an entity data unit that is posted by a user may be searched, which may store a correspondence relationship between an instant messaging identifier of the user and address information of a website which posts the entity data unit, or may store a correspondence relationship between user information of the user and attribute information and/or name information of the posted entity data unit. No limitation thereon is imposed herein.

In addition, the entity data unit stored in the target database may be found or searched synchronously on a page of an online store opened by the user.

It should be noted that the entity data unit involved in the embodiments of the present disclosure refers to a set of certain data information. For example, in a web portal, a music channel, a reading channel, or the like, may be considered as an entity data unit. For another example, an independent selling user or an electronic store may be considered as an entity data unit for a shopping website. In another example, for a shopping website, commodity information that is posted by an independent selling user may be considered as an entity data unit.

In addition, due to different data information included in entity data units, an entity data unit may be an entity data unit having one or more types of attribute information. Using the example of the entity data unit as an electronic store, the attribute information may be a combination of one or more pieces of the following attribute information: commodity sales volume, ratings thereof from buyers, a credibility level of the electronic store, a commodity return rate, etc.

An application scenario of the embodiments of the present disclosure includes, but is not limited to, the following scenario:

A user information classification system includes, but is not limited to: an instant messaging server, a website server, and an instant messaging client.

For example, a user A applies to create a website on a website server set up by an Internet provider, and post commodity information of the user A in the created website. The commodity information posted by the user A may not only be found in the established website, but also be stored in a target database corresponding to the website server. Commodity information of the user A that is posted in the established website can be viewed by other users.

Another user can communicate with the user A through an instant messaging client to understand commodity information posted by the user A if the commodity information of the user A that is posted in the website is desirable or after the commodity information posted by the user A in the website is viewed. At that time, the instant messaging server records communication information between the other user and the user A, and the instant messaging server performs classification for user information of the other user who communicates with the user A using the embodiments of the present disclosure in order to facilitate the user A to manage the user information.

The embodiments of the present disclosure are described in details with reference to the accompanying drawings of the specification.

First Embodiment

FIG. 1 is a flowchart illustrating a method of classifying user information in accordance with a first embodiment of the present disclosure. The method includes:

Block 101: An instant messaging server obtains an entity data unit that is posted by a first user and is stored in a target database.

Figure 2:
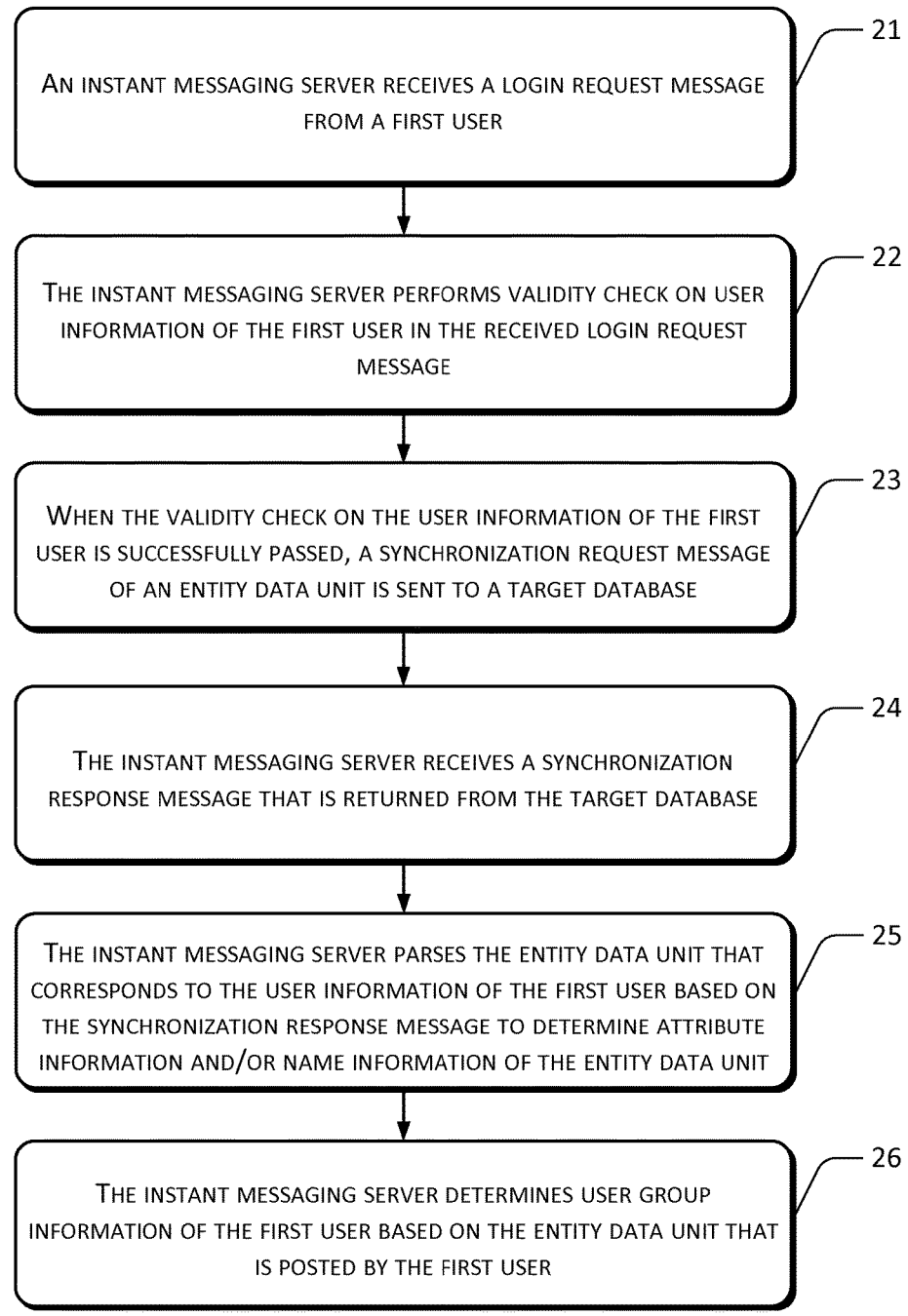
FIG. 2 is a flowchart illustrating acquisition of an entity data unit that is posted by a first user and is stored in a target database by an instant messaging server.

At block 101, an approach of the instant messaging server to obtain the entity data unit that is posted by the first user and is stored in the target database includes, but is not limited to, the following:

FIG. 2 is a flowchart illustrating acquisition of an entity data unit that is posted by a first user and is stored in a target database by an instant messaging server.

Block 21: The instant messaging server receives a login request message from the first user.

The login request message includes user information of the first user.

The user information of the first user may be account information (which includes information of a username and a password) for the first user to log in the instant messaging server, or an instant messaging identifier of the first user logging into an instant messaging client. No limitation thereon is imposed herein.

It should be noted that an instant messaging identifier refers to identifier information (for example, a QQ number) that can uniquely identify a user and is generated by an instant messaging server when the user registers login account information in the instant messaging server. A difference between the instant messaging identifier and the username information in the account information is that: the username information may be configured by the user and stored on the side of the instant messaging server, which can uniquely identify the user. This, however, does not exclude the possibility that the username information is the instant messaging identifier.

Block 22: The instant messaging server performs a validity check on the user information of the first user in the received login request message.

An approach of the instant messaging server to perform the validity check on the user information of the first user includes, but is not limited to: authenticating whether the user information of the first user in the received login request message is the same as locally stored user information of the first user; if they are the same, determining that the validity check is successfully passed; otherwise, determining that the validity check fails.

Block 23: When the validity check on the user information of the first user is successfully passed, a synchronization request message of the entity data unit is sent to the target database.

The synchronization request message includes the user information of the first user.

Optionally, the synchronization request message includes the instant messaging identifier of the first user.

It should be noted that there is no limitation as to how the target database obtains the user information of the first user herein.

Block 24: The instant messaging server receives the synchronization response message that is returned from the target database.

The synchronization response message is used for indicating whether the entity data unit that is posted by the first user is updated.

Specifically, at block 24, after receiving the synchronization request message, the target database attempts to find whether an entity data unit corresponding to the user information of the first user is stored locally based on the user information of the first user included in the synchronization request message, determines whether the stored entity data unit is updated upon locally finding the entity data unit corresponding to the user information of the first user, and adds the updated entity data unit into a synchronization response message for returning to the instant messaging server upon determining that the stored entity data unit is updated.

If no update has occurred for the stored entity data unit, the target database adds the stored entity data unit into the synchronization response message for returning to the instant messaging server; or adds an instruction indicating no update into the synchronization response message for returning to the instant messaging server.

Optionally, when the received synchronization request message includes the instant messaging identifier of the first user, the target database determines address information associated with the posting of the entity data unit that corresponds to the instant messaging identifier of the first user included in the synchronization request message based on a correspondence relationship between the stored instant messaging identifier and the address information associated with the posting of the entity data unit, and adds the entity data unit in a website corresponding to the determined address information into the synchronization response message for returning to the instant messaging server.

Block 25: The instant messaging server parses the entity data unit that corresponds to the user information of the first user based on the synchronization response message to determine attribute information and/or name information of the entity data unit.

It should be noted that, after receiving the synchronization response message, the instant messaging server determines whether the synchronization response message includes an updated entity data unit. When a determination result indicates that the synchronization response message includes an updated entity data unit, the updated entity data unit is received. When the determination result indicates that the synchronization response message does not include an updated entity data unit, the entity data unit that is posted by the first user is read from a local cache.

Specifically, at block 25, due to differences in content included in synchronization response messages that are returned from the target database and received by the instant messaging server, certain differences in subsequent operations exist.

The instant messaging server receives the synchronization response message that is returned from the target database, and compares a first entity data unit that corresponds to the user information of the first user and is included in the synchronization response message to a locally stored second entity data unit that corresponds to the user information of the first user. When a comparison result indicates that content of the first entity data unit is different from that of the second entity data unit, the instant messaging server determines that the synchronization response message includes the updated entity data unit that corresponds to the user information of the first user. When the comparison result indicates that content of the first entity data unit is the same as that of the second entity data unit, the instant messaging server determines that the synchronization response message does not include an updated entity data unit that corresponds to the user information of the first user.

When the received synchronization response message includes the updated entity data unit corresponding to the user information of the first user, the updated entity data unit that is received is parsed, and attribute information, name information, etc., of the updated entity data unit is determined.

For example, an entity data unit that is received is iphone4. Parsing is performed for this entity data unit to determine that name information of the entity data unit includes the fourth generation of Apple phone, and that the attribute information includes a smartphone, with a brand being Apple, a color being white or black, etc.

Optionally, after parsing the updated entity data unit that is received, the method further includes:

locally storing the updated entity data unit that is received.

In other words, the locally stored entity data unit is updated.

When the received synchronization response message does not include the entity data unit that corresponds to the user information of the first user, the entity data unit corresponding to the user information of the first user is obtained from a local cache. Determination is made as to whether the entity data unit has been parsed. Upon determining that the entity data unit has not been parsed, parsing is performed for the entity data unit to determine attribute information, name information, etc., of the entity data unit.

It should be noted that the attribute information herein refers to information related to commodity, which is not limited to an attribute. Examples include ratings of a commodity, quality information of the commodity, etc.

Block 26: The instant messaging server determines user group information of the first user based on the entity data unit that is posted by the first user.

Specifically, at block 26, the instant messaging server establishes a correspondence relationship between the user information of the first user and the attribute information of the entity data unit based on the entity data unit that is posted by the first user.

Meanwhile, the instant messaging server generates user group information of the first user based on the attribute information of the entity data unit.

For example, the entity data unit that is posted by the first user and obtained by the instant messaging server includes "iphone4", and one piece of attribute information of this "iphone4" is a smartphone. As such, user group information of the first user that is generated for commodity attribute information includes "smartphone", such as a smartphone group.

Alternatively, the instant messaging server establishes a correspondence relationship between the user information of the first user and the name information of the entity data unit based on the entity data unit that is posted by the first user.

Meanwhile, the instant messaging server generates user group information of the first user based on the name information of the entity data unit.

For example, the entity data unit that is posted by the first user and obtained by the instant messaging server includes a name of "iphone4", and one piece of name information of this "iphone4" is the fourth generation of Apple phone. As such, user group information of the first user that is generated for commodity name information includes "iphone4" or "fourth generation of Apple phone", such as an iphone4 group or a group associated with the fourth generation of Apple phone.

It should be noted that the user group information represents property information of the entity data unit that is posted by the first user.

The user group information may be category information, such as a category associated with mobile phones or a category associated with computers, may be attribute information, such as smartphones or traditional phones, or may be name information, such as Samsung phones or Apple phones. A degree of granularity of classification of the user group information may be determined according to needs of a user who manages user information of clients, or may be determined according to actual needs. No limitation thereon is imposed herein.

Table 1 is a list showing a correspondence relationship between attribute information and name information of an entity data unit that is posted by a first user and user group information of the first user.

TABLE 1

| User Information of First User | User Group Information | |
|---|---|---|
| | Attribute information | Smartphones |
| | | Traditional phones |
| | Name information | Samsung G-series phones |
| | | Samsung T-series phones |

As can be seen from Table 1, determining a correspondence relationship between an entity data unit and user group information of a first user helps performing classification for user information of a second user, thus improving the efficiency of managing the user information of the second user by the first user.

It should be noted that block 26 may be performed within block 101, block 102 or block 103. In the embodiment of the present disclosure, an order of performing block 26 is not limited to a manner described in the embodiment of the present disclosure.

Block 102: Conversation information generated between a second user and the first user through an instant messaging client is matched with the entity data unit.

At block 102, the conversation information between the second user and the first user that is generated through the instant messaging client is first obtained.

Specifically, after the first user logs in an instant messaging client, the instant messaging server searches for conversation information generated between the second user and the first user within a set time period.

It should be noted that the found conversation information may also be conversation information that is sent by the second user to the first user during a period between a previous logoff from the instant messaging client and a current login to the instant messaging client, with no specific limitation being imposed herein.

The conversation information includes, but is not limited to, text information, voice information, and video information.

It should be noted that, the number of second users who send conversation information to the first user is not limited to one.

For example, user information of a first user is "AAAA", and user information of second users is "BBBB", "CCCC", and "DDDD", within a set time period. "BBBB" sends two pieces of conversation information to "AAAA", i.e., "Do you still have iphone4 for sale?" and "Do you still have black iphone4?". "CCCC" sends one piece of conversation information to "AAAA", i.e., "Can I preorder a Samsung phone?". "DDDD" sends one piece of conversation information to "AAAA", i.e., "Is it possible to ship Mini iPad for free and pay cash on delivery?".

Second, parsing is performed for the obtained conversation information, and determination is made as to whether the conversation information includes attribute information and/or name information of the entity data unit corresponding to the user information of the first user.

Specifically, parsing is performed for the obtained conversation information, i.e., determining an entity data unit that appears in the conversation information. For example, an entity data unit that appears or is involved in "Do you still have iphone4 for sale?" is iphone4 and the conversation information is determined to be conversation information concerning iphone4; the entity data unit that appears or is involved in "Do you still have black iphone4" is black iphone4 and the conversation information may similarly be determined to be the conversation information concerning iphone4 and conversation information concerning black iphone4; the entity data unit that appears or is involved in "Can I preorder a Samsung phone?" is a Samsung phone and the conversation information may be determined to be conversation information concerning a Samsung phone; and the entity data unit that appears or is involved in "Is it possible to ship Mini iPad for free and pay cash on delivery?" is Mini iPad and the conversation information may be determined to be conversation information concerning Mini iPad.

Finally, when a determination result indicates that the conversation information includes the attribute information and/or the name information of the entity data unit corresponding to the user information of the first user, a correspondence relationship between the user information of the second user corresponding to the conversation information and the attribute information and/or the name information of the entity data unit corresponding to the user information of the first user is established.

Specifically, the entity data unit that is concerned in the conversation information is compared with the entity data unit corresponding to the user information of the first user to determine whether the entity data unit that is concerned in the conversation information includes the attribute information and/or the name information of the entity data unit that corresponds to the user information of the first user.

Upon determining that the entity data unit that is concerned in the conversation information includes the attribute information and/or the name information of the entity data unit corresponding to the user information of the first user, the correspondence relationship between the user information of the second user corresponding to the conversation information and the attribute information and/or the name information of the entity data unit corresponding to the user information of the first user is established.

Optionally, upon determining that the entity data unit that is concerned in the conversation information includes the attribute information and/or the name information of the entity data unit corresponding to the user information of the first user, the attribute information and/or the name information of the entity data unit that is concerned in the conversation information is marked in the user information of the second user corresponding to the conversation information. This not only facilitates subsequent classification of the user information of the second user, but also indicates that the user information of the second user has been analyzed, thereby avoiding repeatedly analyzing the user information of the second user, and saving network resources.

Block 103: User group information of the first user to which user information of the second user corresponding to the conversation information belongs is determined based on a matching result.

The user group information of the first user is determined based on the attribute information and/or the name information of the entity data unit that is posted by the first user. Specific implementation may be achieved through the approach of obtaining the user group information at block 102, or may be alternatively achieved by other methods. No limitation thereon is imposed herein.

Specifically, at block 103, attribute information and/or name information corresponding to the user information of the second user is determined based on the correspondence relationship between the user information of the second user corresponding to the conversation information and the attribute information and/or the name information of the entity data unit corresponding to the user information of the first user that is established at block 102.

The user group information of the first user corresponding to the attribute information and/or the name information is searched for based on the determined attribute information and/or the determined name information. When the user group information of the first user corresponding to the attribute information and/or the name information is found, an association relationship between the user information of the second user and the found user group information of the first user is determined.

When the user group information of the first user corresponding to the attribute information and/or the name information is not found, the user group information of the first user is generated based on the attribute information and/or the name information, and an association relationship between the user information of the second user and the generated user group information of the first user is established.

After determining the association relationship between the user information of the second user and the user group information of the first user, the method further includes:

loading the user information of the second user into a group corresponding to the user group information of the first user.

It should be noted that, provided that the conversation information with the first user includes content information of the entity data unit, a user having conversation with the first user belongs to a group where the user group information is located.

It should be noted that, when the user information of the second user is loaded into the group corresponding to the user group information of the first user, a situation in which the user information of the second user appears in at least one group exists, i.e., the user information of the second user may appear in multiple groups. No limitation thereon is imposed herein.

As such, this helps the first user to promote commodity information to the second user, and improve the efficiency of posting the commodity information by the first user.

Table 2 is a list showing that user information of a second user is loaded into a group corresponding to user group information of a first user.

TABLE 2

| User Information of First User | User Group Information | |
|---|---|---|
| | Commodity attribute information | Smartphones: BBBB, CCCC Traditional phones |
| | Commodity name information | Samsung G-series phones: CCCC Samsung T-series phones: CCCC |

Through the solution in the first embodiment of the present disclosure, an instant messaging server obtains an entity data unit posted by a first user from a target database, matches conversation information generated between a second user and the first user through an instant messaging client with the entity data unit, and determines user group information of the first user to which user information of the second user corresponding to the conversation information belongs based on a matching result, where the user group information of the first user is determined based on attribute information and/or name information of the entity data unit posted by the first user. As such, for the first user using the instant messaging client, after the first user logs into the instant messaging server, the instant messaging server obtains the entity data unit that is posted by the first user from the target database based on login information of the first user, and determines a degree of concern associated with the second user with respect to the entity data unit that is posted by the first user through a degree of matching of the conversation information between the second user and the first user that is generated through the instant messaging client to the entity data unit that is posted by the first user, performs grouping for the user information of the second user using the degree of concern, which not only improves the approach of managing the user information of the second user by the first user, but also promotes commodity information to the second user in a targeted manner based on a group to which the second user belongs, thereby improving the efficiency of promulgating the commodity information.

Second Embodiment

The second embodiment of the present disclosure provides a method of classifying user information, which describes each block of the first embodiment of the present disclosure in detail. The method includes:

First block: An instant messaging server obtains a stored entity data unit that is posted by a first user from a target database.

At the first block, an approach that the instant messaging server obtain the stored entity data unit that is posted by the first user from the target database, includes, but is not limited to, the following:

First, the instant messaging server receives a login request message from the first user.

The login request message includes user information of the first user.

The user information of the first user may be account information with which the user logs in the instant messaging server, or an instant messaging identifier with which the user logs in to an instant messaging client. No limitation thereon is imposed herein.

Second, the instant messaging server performs a validity check on the user information of the first user in the received login request message.

An approach conducted by the instant messaging server to perform the validity check on the user information of the first user, includes, but is not limited to: authenticating whether the user information of the first user in the received login request message is the same as locally stored user information of the first user; if they are the same, determining that the validity check is successfully passed; otherwise, determining that the validity check fails.

Third, when the validity check on the user information of the first user is successfully passed, a synchronization request message of the entity data unit is sent to the target database.

The synchronization request message includes the user information of the first user.

Optionally, the synchronization request message includes the instant messaging identifier of the first user.

It should be noted that, there is no limitation on how the target database obtains the user information of the first user herein.

Fourth, the instant messaging server receives a synchronization response message that is returned by the target database.

Specifically, after receiving the synchronization request message, the target database attempts to find whether an entity data unit corresponding to the user information of the first user is stored locally based on the user information of the first user included in the synchronization request message, determines whether the stored entity data unit is updated upon locally finding the entity data unit corresponding to the user information of the first user, and adds the updated entity data unit into a synchronization response message for returning to the instant messaging server upon determining that the stored entity data unit is updated.

If no update has occurred for the stored entity data unit, the target database adds the stored entity data unit into the synchronization response message for returning to the instant messaging server; or adds an instruction indicating no update into the synchronization response message for returning to the instant messaging server.

Optionally, when the received synchronization request message includes the instant messaging identifier of the first user, the target database determines address information associated with the posting of the entity data unit that corresponds to the instant messaging identifier of the first user included in the synchronization request message based on a correspondence relationship between the stored instant messaging identifier and the address information associated with the posting of the entity data unit, and adds the entity data unit in a website corresponding to the determined address information into the synchronization response message for returning to the instant messaging server.

Fifth, the instant messaging server parses the entity data unit that corresponds to the user information of the first user based on the synchronization response message to determine attribute information and/or name information of the entity data unit.

It should be noted that, after receiving the synchronization response message, the instant messaging server determines whether the synchronization response message includes an updated entity data unit. When a determination result indicates that the synchronization response message includes an updated entity data unit, the updated entity data unit is received. When the determination result indicates that the synchronization response message does not include an updated entity data unit, the entity data unit that is posted by the first user is read from a local cache.

Specifically, due to differences in content included in synchronization response messages that are returned from the target database and received by the instant messaging server, certain differences in subsequent operations exist.

The instant messaging server receives the synchronization response message that is returned from the target database, and compares a first entity data unit that corresponds to the user information of the first user and is included in the synchronization response message to a locally stored second entity data unit that corresponds to the user information of the first user. When a comparison result indicates that content of the first entity data unit is different from that of the second entity data unit, the instant messaging server determines that the synchronization response message includes the updated entity data unit that corresponds to the user information of the first user. When the comparison result indicates that content of the first entity data unit is the same as that of the second entity data unit, the instant messaging server determines that the synchronization response message does not include an updated entity data unit that corresponds to the user information of the first user.

When the received synchronization response message includes the updated entity data unit corresponding to the user information of the first user, the updated entity data unit that is received is parsed, and attribute information, name information, etc., of the updated entity data unit is determined.

Optionally, after parsing the updated entity data unit that is received, the method further includes:

locally storing the updated entity data unit that is received.

In other words, the locally stored entity data unit is updated.

When the received synchronization response message does not include the entity data unit that corresponds to the user information of the first user, the entity data unit corresponding to the user information of the first user is obtained from a local cache. Determination is made as to whether the entity data unit has been parsed. Upon determining that the entity data unit has not been parsed, parsing is performed for the entity data unit to determine attribute information, name information, etc., of the entity data unit.

Sixth, the instant messaging server determines user group information of the first user based on the entity data unit that is posted by the first user.

Specifically, the instant messaging server establishes a correspondence relationship between the user information of the first user and the attribute information of the entity data unit based on the entity data unit that is posted by the first user.

Meanwhile, the instant messaging server generates the user group information of the first user based on the attribute information of the entity data unit.

Alternatively, the instant messaging server establishes a correspondence relationship between the user information of the first user and the name information of the entity data unit based on the entity data unit that is posted by the first user.

Meanwhile, the instant messaging server generates the user group information of the first user based on the name information of the entity data unit.

The user group information may be category information, such as a category associated with mobile phones or a category associated with computers, may be attribute information, such as smartphones or traditional phones, or may be name information, such as Samsung phones or Apple phones. A degree of granularity of classification of the user group information may be determined according to needs of a user who manages user information of clients, or may be determined according to actual needs. No limitation thereon is imposed herein.

Second Block: Conversation information generated between a second user and the first user through an instant messaging client is matched with the entity data unit.

At the second block, an approach of matching the conversation information generated between the second user and the first user through the instant messaging client, includes, but is not limited to, the following:

First, the conversation information between the second user and the first user that is generated through the instant messaging client is obtained, and the conversation information is analyzed.

Specifically, after the first user logs in an instant messaging client, the instant messaging server searches for conversation information generated between the first user and the second user within a set time period.

The conversation information includes, but is not limited to, text information, voice information, and video information.

It should be noted that, the obtained conversation information is not limited to one piece of conversation information, and may include multiple pieces of conversation information.

Figure 3:
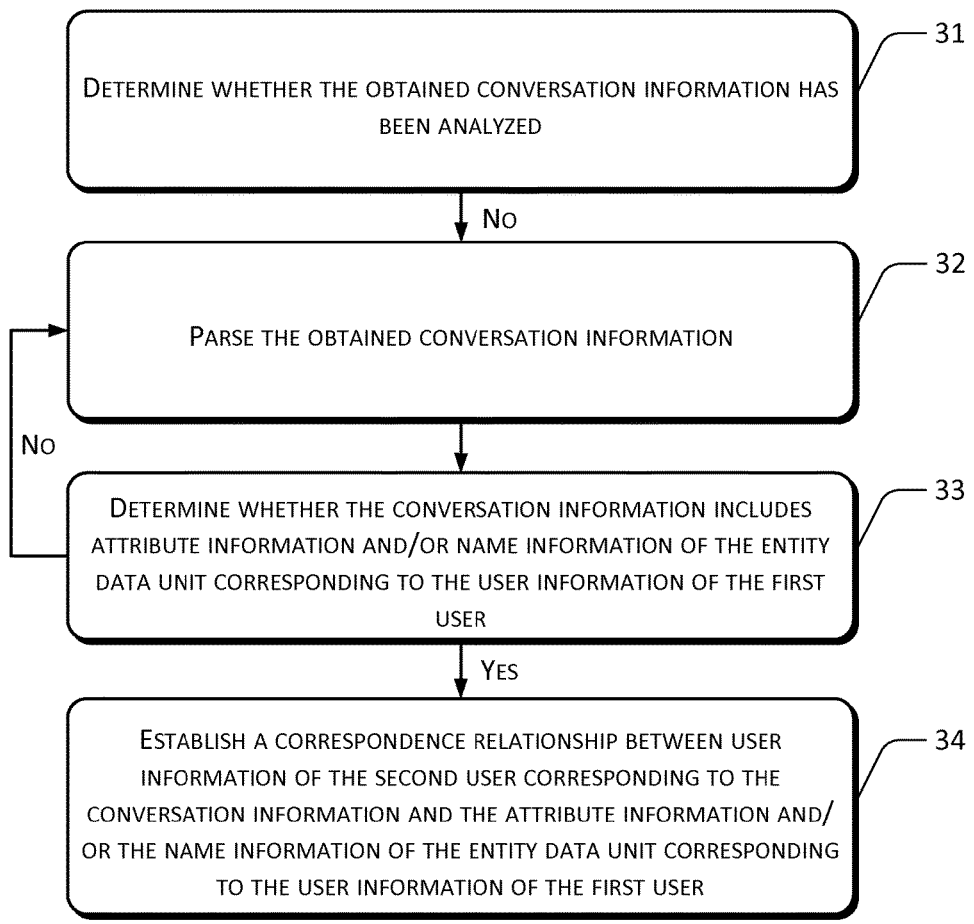
FIG. 3 is a flowchart illustrating an analysis of conversation information between a second user and a first user that is generated through an instant messaging client.

FIG. 3 is a schematic flowchart illustrating an analysis of the conversation information between the first user and the second user that is generated through the instant messaging client.

Block 31 determines whether the obtained conversation information has been analyzed, and proceeds to perform block 32 if not analyzed, or ends subsequent operation if analyzed.

Specifically, determination is made as to whether the user information of the second user corresponding to the obtained conversation information has been allocated to a group corresponding to the user group information of the first user. If not, block 32 is to be performed. If yes, the process is ended without performing subsequent operations.

Block 32 parses the obtained conversation information.

Specifically, content information included in the obtained conversation information is determined.

Block 33 determines whether the conversation information includes attribute information and/or name information of the entity data unit corresponding to the user information of the first user, and continues to perform block 34 if affirmative, or turns to block 32 to start analyzing a next piece of conversation information otherwise.

Specifically, an operation is performed for matching content information obtained by analyzing the conversation information with the attribute information and/or the name information of the entity data unit corresponding to the user information of the first user, to determine whether the content information obtained by analyzing the conversation information includes the attribute information and/or the name information of the entity data unit corresponding to the user information of the first user.

Block 34 establishes a correspondence relationship between user information of the second user corresponding to the conversation information and the attribute information and/or the name information of the entity data unit corresponding to the user information of the first user when a determination result indicates that the conversation information includes the attribute information and/or the name information of the entity data unit corresponding to the user information of the first user.

Optionally, upon determining that the entity data unit that is concerned in the conversation information includes the attribute information and/or the name information of the entity data unit corresponding to the user information of the first user, the attribute information and/or the name information of the entity data unit that is concerned in the conversation information is marked in the user information of the second user corresponding to the conversation information. This not only facilitates subsequent classification of the user information of the second user, but also indicates that the user information of the second user has been analyzed, thereby avoiding repeatedly analyzing the user information of the second user, and saving network resources.

Third block determines user group information of the first user to which the user information of the second user corresponding to the conversation information belongs based on a matching result.

The user group information of the first user is determined based on the attribute information and/or name the information of the entity data unit that is posted by the first user. Specific implementation may be achieved through the approach of obtaining the user group information at the second block, or may be alternatively achieved by other methods. No limitation thereon is imposed herein.

Figure 4:
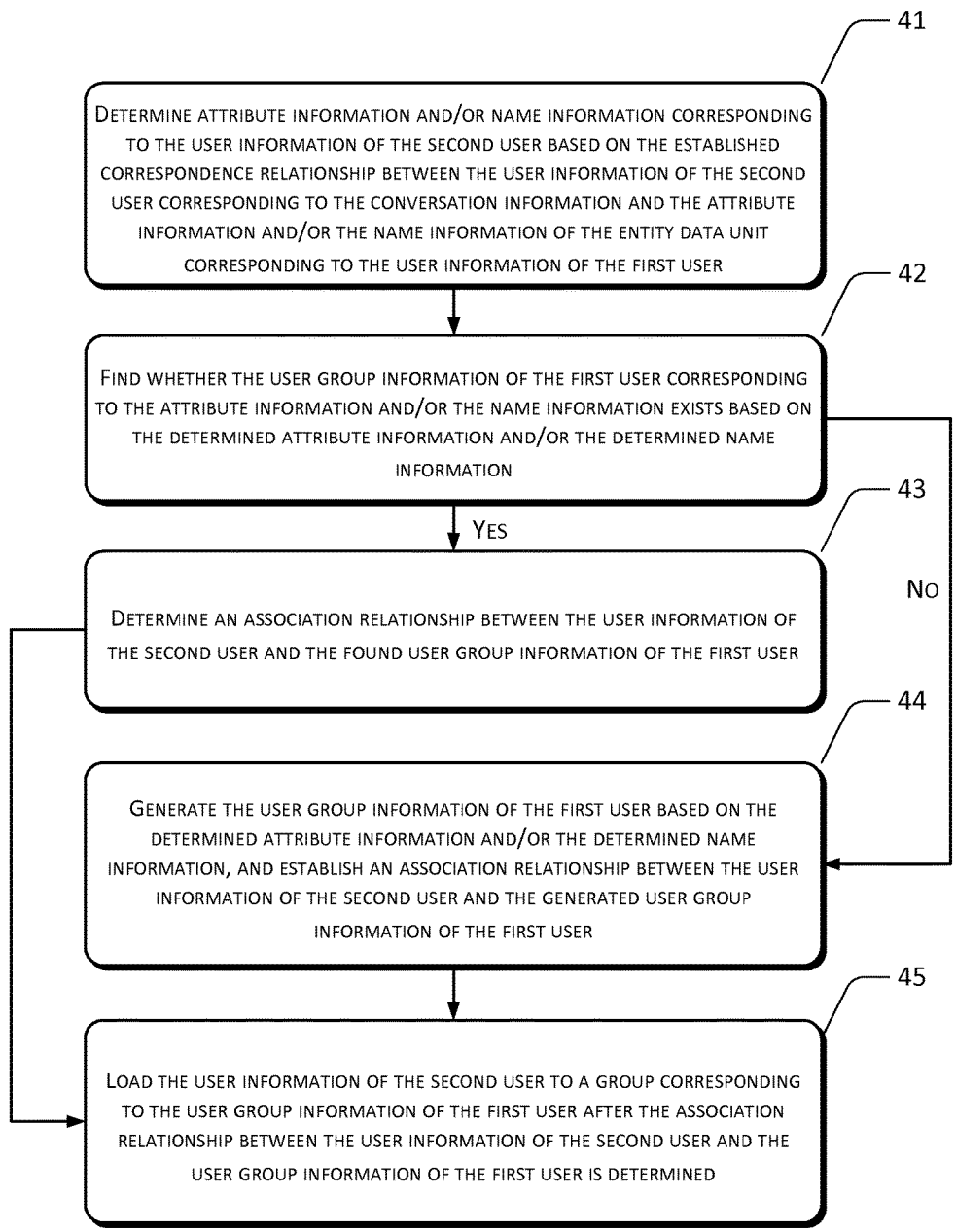
FIG. 4 is a flowchart illustrating determination of user group information of a first user that corresponds to user information of a second user.

Specifically, an approach of determining the user group information of the first user to which the user information of the second user corresponding to the conversation information belongs based on the matching result, includes, but is not limited to, the following:

FIG. 4 is a flowchart illustrating determination of the user group information of the first user to which the user information of a second user belongs.

Block 41 determines attribute information and/or name information corresponding to the user information of the second user based on the established correspondence relationship between the user information of the second user corresponding to the conversation information and the attribute information and/or the name information of the entity data unit corresponding to the user information of the first user.

Block 42 finds whether the user group information of the first user corresponding to the attribute information and/or the name information exists based on the determined attribute information and/or the determined name information. Block 43 is performed if exists; otherwise, block 44 is performed.

Block 43 determines an association relationship between the user information of the second user and the found user group information of the first user when the user group information of the first user corresponding to the attribute information and/or the name information is found. The process turns to block 45.

Block 44 generates the user group information of the first user based on the determined attribute information and/or the determined name information, and establishes an association relationship between the user information of the second user and the generated user group information of the first user when the user group information of the first user corresponding to the attribute information and/or the name information is not found. The process turns to block 45.

Block 45 loads the user information of the second user to a group corresponding to the user group information of the first user after the association relationship between the user information of the second user and the user group information of the first user is determined.

It should be noted that, when loading the user information of the second user into the group corresponding to the user group information of the first user, a situation in which the user information of the second user appears in at least one group exists, i.e., the user information of the second user may appear in multiple groups. No limitation thereon is imposed herein.

As such, this helps the first user to promote commodity information to the second user, and improve the efficiency of posting the commodity information by the first user.

Third Embodiment

Figure 5:
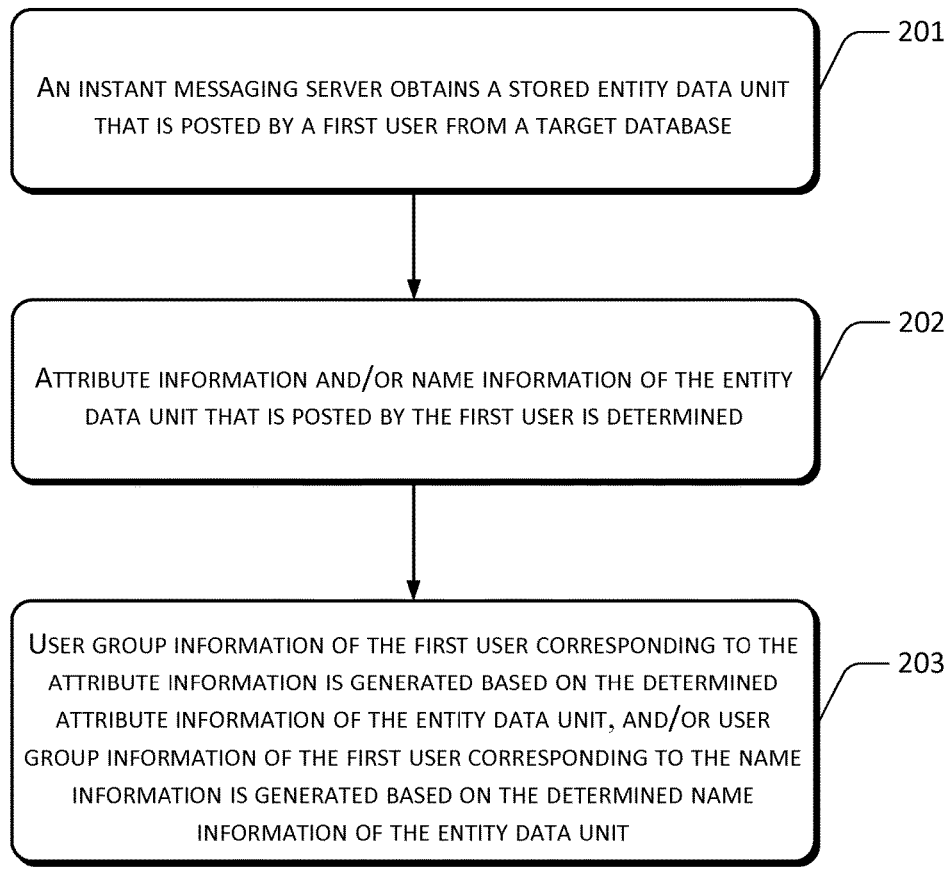
FIG. 5 is a flowchart illustrating a method of obtaining user group information in accordance with a third embodiment of the present disclosure.

FIG. 5 is a flowchart illustrating a method of obtaining user group information in accordance with a third embodiment of the present disclosure.

Block 201: An instant messaging server obtains a stored entity data unit that is posted by a first user from a target database.

Block 202: Attribute information and/or name information of the entity data unit that is posted by the first user is determined.

It should be noted that, other than determining the attribute information and/or the name information of the entity data unit posted by the first user, other information related to the entity data unit posted by the first user may further be obtained. No limitation thereon is imposed herein.

Block 203: User group information of the first user corresponding to the attribute information is generated based on the determined attribute information of the entity data unit, and/or user group information of the first user corresponding to the name information is generated based on the determined name information of the entity data unit.

Fourth Embodiment

Figure 6:
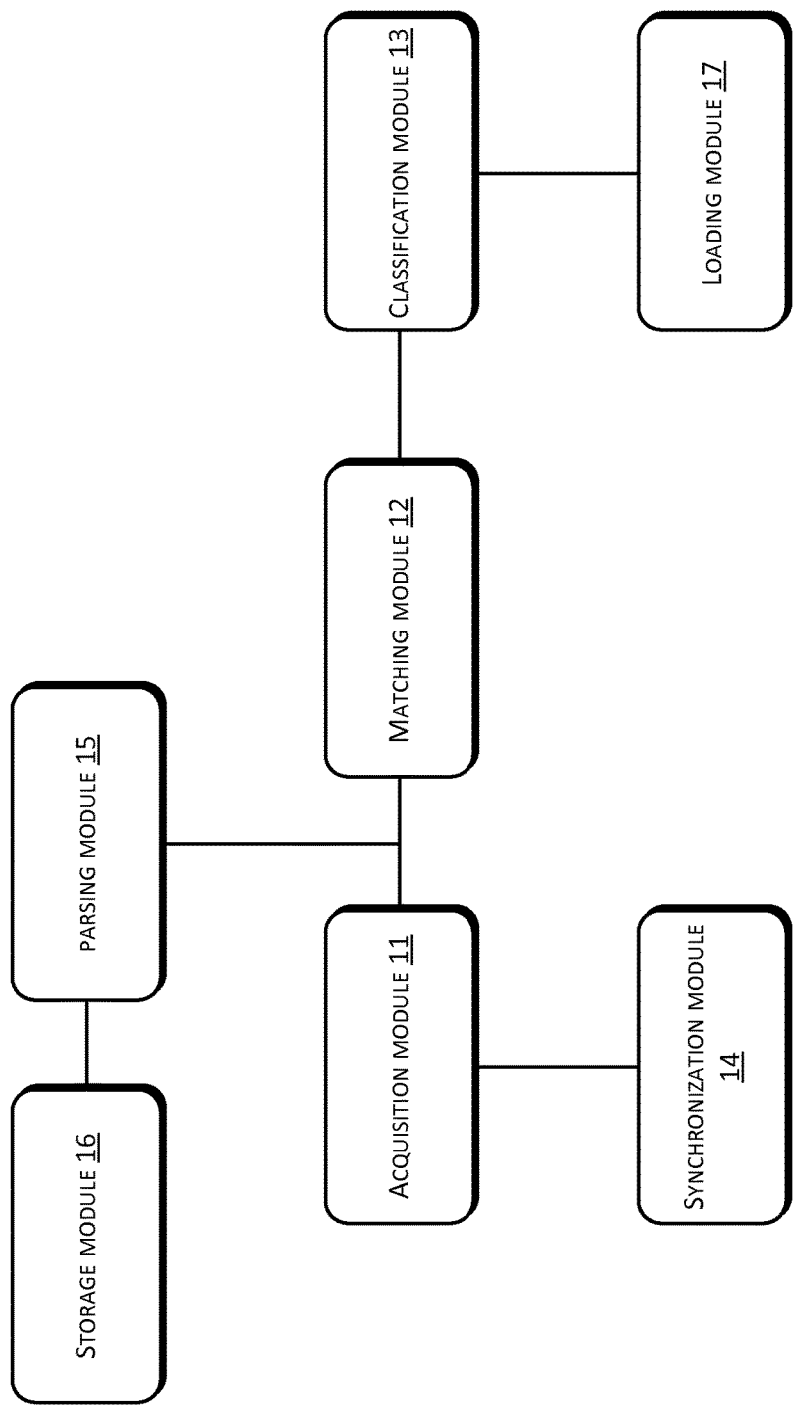
FIG. 6 is a structural diagram illustrating an apparatus of classifying user information in accordance with a fourth embodiment of the present disclosure.

FIG. 6 is a structural diagram illustrating an apparatus of classifying user information in accordance with a fourth embodiment of the present disclosure. The third embodiment of the present disclosure belongs to a same inventive concept as the first embodiment and the second embodiment of the present disclosure. The classification apparatus includes: an acquisition module 11, a matching module 12, and a classification module 13.

The acquisition module 11 is used for obtaining a stored entity data unit posted by a first user from a target database.

The matching module 12 is used for matching conversation information between a second user and the first user that is through an instant messaging client with the entity data unit.

The classification module 13 is used for determining user group information of the first user to which user information of the second user corresponding to the conversation information belongs based on a matching result, where the user group information of the first user is determined according to attribute information and/or name information of the entity data unit posted by the first user.

The apparatus further includes a synchronization module 14, wherein the synchronization module 14 is used for receiving a login request message from the first user, the login request message including user information of the first user; sending a synchronization request message of the entity data unit to the target database after a validity check on the user information of the first user is performed and the check is successfully passed, wherein the synchronization request message includes the user information of the first user; and receiving a synchronization response message that is returned from the target database, wherein the synchronization response message is used for indicating whether the entity data unit that is posted by the first user is updated.

The acquisition module 11 is used for determining whether the synchronization response message includes an updated entity data unit; and receiving the updated entity data unit when a determination result indicates that the synchronization response message includes the updated entity data unit; or reading the entity data unit posted by the first user from a local cache when the determination result indicates that the synchronization response message does not include the updated entity data unit.

The apparatus further includes a parsing module 15, wherein the parsing module 15 is used for parsing the entity data unit based on the obtained entity data unit that is posted by the first user upon obtaining the entity data unit that is posted by the first user to determine the attribute information and/or the name information of the entity data unit.

The apparatus further includes a storage module 16, wherein the storage module 16 is used for locally storing the received updated entity data unit after the received updated entity data unit is parsed.

Determining the user group information based on the attribute information and/or the name information of the entity data unit that is posted by the first user, includes:

after obtaining the entity data unit that is posted by the first user, establishing a correspondence relationship between the user information of the first user and the attribute information of the entity data unit, and determining the user group information of the first user based on the attribute information of the entity data unit; and/or after obtaining the entity data unit that is posted by the first user, establishing a correspondence relationship between the user information of the first user and the name information of the entity data unit, and determining the user group information of the first user based on the name information of the entity data unit.

The matching module 12 is used for obtaining the conversation information generated between the second user and the first user using the instant messaging client; determining whether the conversation information includes the attribute information and/or the name information of the entity data unit corresponding to the user information of the first user; and when a determination result indicates that the conversation information includes the attribute information and/or the name information of the entity data unit corresponding to the user information of the first user, establishing a correspondence relationship between the user information of the second user corresponding to the conversation information and the attribute information and/or the name information of the entity data unit corresponding to the user information of the first user.

The classification module 13 is used for determining attribute information and/or name information corresponding to the user information of the second user based on the established correspondence relationship between the user information of the second user corresponding to the conversation information and the attribute information and/or the name information of the entity data unit corresponding to the user information of the first user; searching for the user group information that corresponds to the attribute information and/or the name information of the first user based on the determined attribute information and/or the determined name information; and upon finding the user group information that corresponds to the attribute information and/or the name information of the first user, determining an association relationship between the user information of the second user and the found user group information of the first user.

The classification module 13 is further used for generating the user group information of the first user based on the attribute information and/or the name information when the user group information that corresponds to the attribute information and/or the name information of the first user is not found; and determining an association relationship between the user information of the second user corresponding to the conversation information and the generated user group information of the first user.

The apparatus further includes a loading module 17, wherein the loading module 17 is used for loading the user information of the second user into a group corresponding to the user group information of the first user after the association relationship between the user information of the second user and the user group information of the first user is determined.

It should be noted that the classification apparatus described in the fourth embodiment of the present disclosure may be a logical component integrated in an instant messaging server, or a third apparatus unit independent from the instant messaging server. No limitation thereon is imposed herein.

Fifth Embodiment

Figure 7:
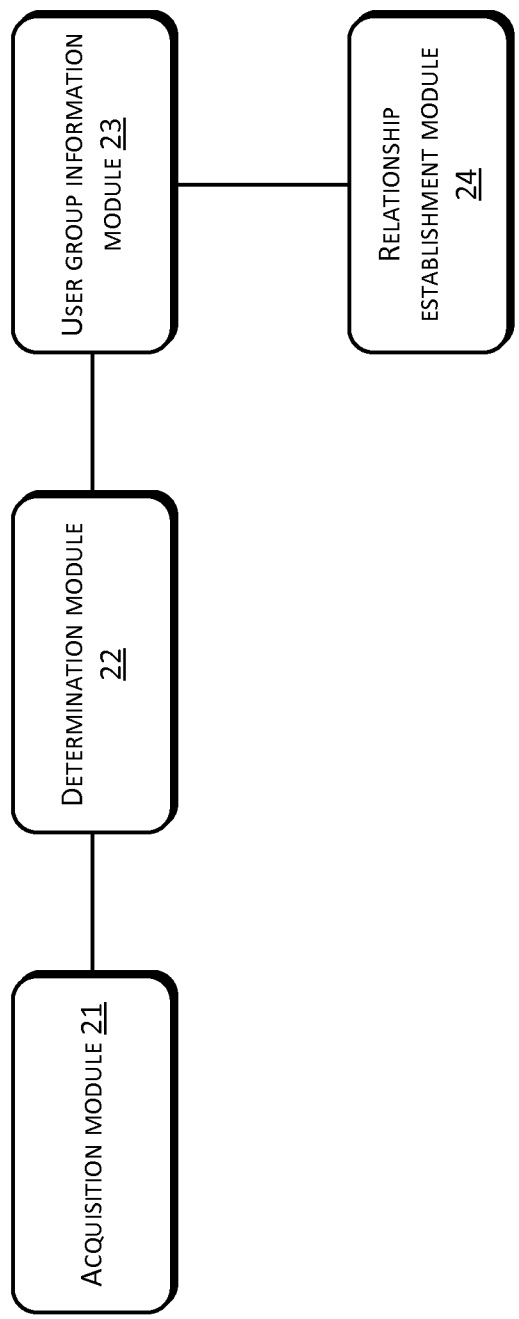
FIG. 7 is a structural diagram illustrating an apparatus of obtaining user group information in accordance with a fifth embodiment of the present disclosure.

FIG. 7 is a structural diagram illustrating an apparatus of obtaining user group information in accordance with a fifth embodiment of the present disclosure. The fifth embodiment of the present disclosure is developed under a same inventive concept as the first embodiment to the fourth embodiment of the present disclosure. The apparatus includes: an acquisition module 21, a determination module 22, and a user group information generation module 23.

The acquisition module 21 is used for acquiring an entity data unit that is posted by a first user and is stored in a target database.

The determination module 22 is used for determining attribute information and/or name information of the entity data unit that is posted by the first user.

The user group information generation module 23 is used for generating user group information of the first user corresponding to the attribute information based on the determined attribute information of the entity data unit; and/or generating user group information of the first user corresponding to the name information based on the determined name information of the entity data unit.

The apparatus further includes a relationship establishment module 24, wherein the relationship establishment module 24 is used for establishing a correspondence relationship between the attribute information of the entity data unit, the user group information that corresponds to the attribute information of the first user, and user information of the first user; and establishing a correspondence relationship between the name information of the entity data unit, the user group information that corresponds to the name information of the first user, and the user information of the first user.

One skilled in the art should understand that the embodiments of the present disclosure may be implemented as methods, apparatuses (devices), or products of computer programs. Therefore, the present disclosure may be implemented in forms of hardware, software, or a combination of hardware and software. Further, the present disclosure may be implemented in the form of products of computer programs executable on one or more computer readable storage media (including, but not limited to, a disk storage device, a CD-ROM, an optical storage device, etc.) that include computer readable program instructions.

Figure 8:
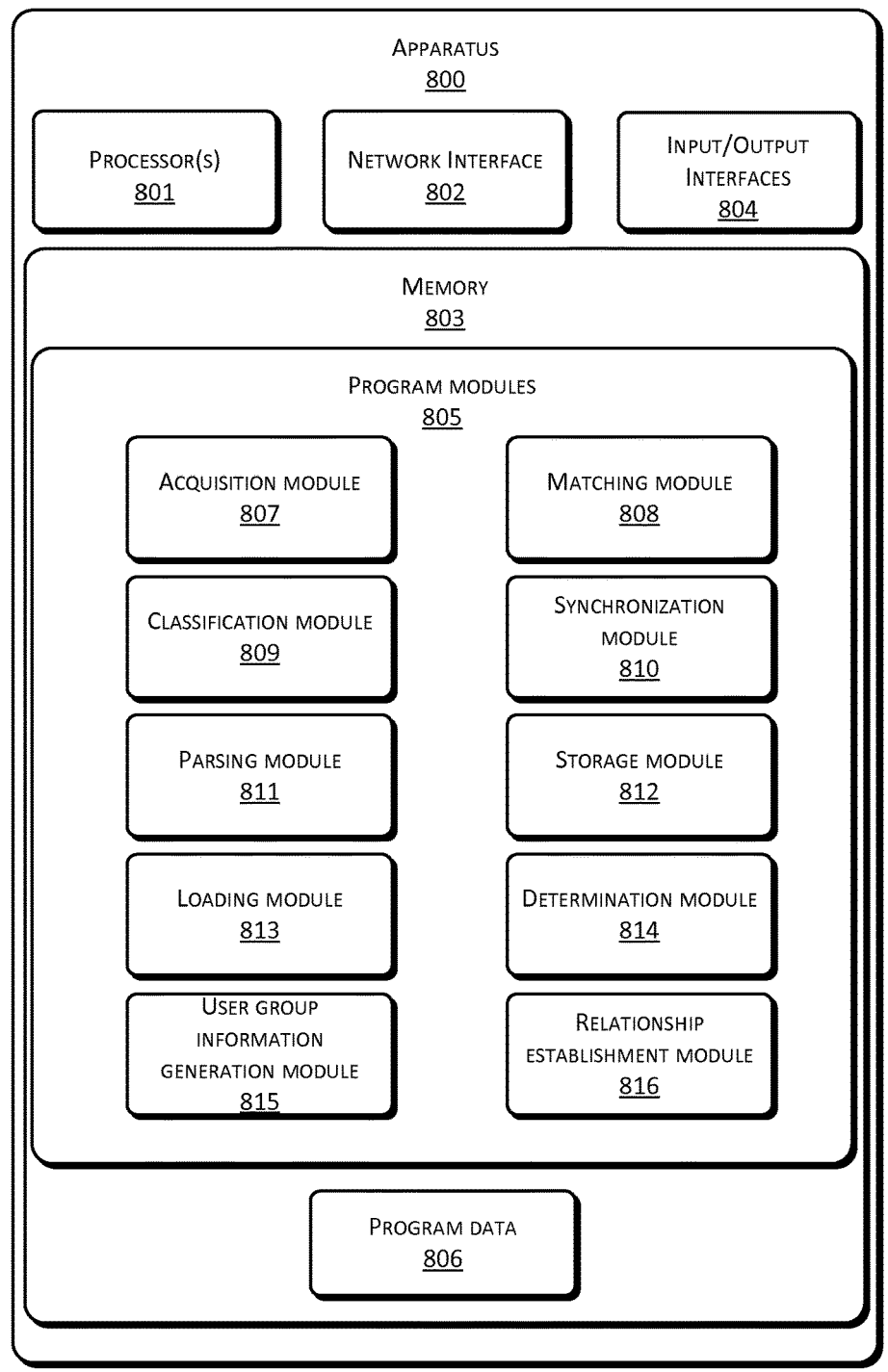
FIG. 8 is a structural diagram illustrating the apparatus described in FIGS. 6 and 7 in further details.

FIG. 8 shows an example apparatus 800, such as the apparatuses as described above, in more detail. In an embodiment, the apparatus 800 may include, but is not limited to, one or more processors 801, a network interface 802, memory 803 and an input/output interface 804.

The memory 803 may include a form of computer readable media, e.g., a non-permanent storage device, random-access memory (RAM) and/or a nonvolatile internal storage, such as read-only memory (ROM) or flash RAM. The memory 803 is an example of computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The memory 803 may include program modules 805 and program data 806. In one embodiment, the program modules 805 may include an acquisition module 807, a matching module 808, a classification module 809, a synchronization module 810, a parsing module 811, a storage module 812, a loading module 813, a determination module 814, a user group information generation module 815 and/or a relationship establishment module 816. Details of these modules may be found in the foregoing description and are not redundantly described herein.

The present disclosure is described in accordance with flowcharts and/or block diagrams of the exemplary methods, apparatuses (devices) and computer program products. It should be understood that each process and/or block and combinations of the processes and/or blocks of the flowcharts and/or the block diagrams may be implemented in the form of computer program instructions. Such computer program instructions may be provided to a general purpose computer, a special purpose computer, an embedded processor or another processing apparatus having a programmable data processing device to generate a machine, so that an apparatus having the functions indicated in one or more blocks described in one or more processes of the flowcharts and/or one or more blocks of the block diagrams may be implemented by executing the instructions by the computer or the other processing apparatus having programmable data processing device.

Such computer program instructions may also be stored in a computer readable memory device which may cause a computer or another programmable data processing apparatus to function in a specific manner, so that a manufacture including an instruction apparatus may be built based on the instructions stored in the computer readable memory device. That instruction device implements functions indicated by one or more processes of the flowcharts and/or one or more blocks of the block diagrams.

The computer program instructions may also be loaded into a computer or another programmable data processing apparatus, so that a series of operations may be executed by the computer or the other data processing apparatus to generate computer implemented processing. Therefore, the instructions executed by the computer or the other programmable apparatus may be used to implement one or more processes of the flowcharts and/or one or more blocks of the block diagrams.

Although exemplary embodiments of the present disclosure are described, persons skilled in the art can make additional changes and modifications to the embodiments once they know basic creative concepts. Therefore, the appended claims are intended to be construed as including the exemplary embodiments and all changes and modifications falling within the scope of the present disclosure.

Apparently, one skilled in the art may make changes and modifications of the present disclosure without departing from the spirit and scope of the present disclosure. If these changes and modifications are within the scope of the claims and their equivalents of the present disclosure, the present disclosure intends to covers such changes and modifications.

What is claimed is:

1. A method comprising:
obtaining, by an instant messaging server, an entity data unit posted by a first user from a target database by:
receiving a synchronization response message that is returned from the target database, wherein the synchronization response message is used for indicating whether the entity data unit posted by the first user is updated,
determining whether the synchronization response message includes an updated entity data unit, and upon determining that the synchronization response message does not include the updated entity data unit, reading the entity data unit posted by the first user from a local cache;

matching conversation information generated between a second user and the first user through an instant messaging client with the entity data unit;

determining user group information of the first user based on a matching result, wherein user information of the second user corresponding to the conversation information belongs to the user group information of the first user, wherein the user group information of the first user is determined according to attribute information or name information of the entity data unit posted by the first user; and classifying the user information of the second user based on the user group information of the first user.

2. The method of claim 1, wherein prior to obtaining the entity data unit, the method further comprises:

receiving a login request message from the first user, wherein the login request message comprises user information of the first user;

performing a validity check on the user information of the first user;

when the validity check is successfully passed, sending a synchronization request message of the entity data unit to the target database, wherein the synchronization request message comprises the user information of the first user; and receiving a synchronization response message that is returned from the target database, wherein the synchronization response message is used for indicating whether the entity data unit posted by the first user is updated.

3. The method of claim 1, wherein obtaining the entity data unit comprises:

upon determining that the synchronization response message includes the updated entity data unit, receiving the updated entity data unit.

4. The method of claim 3, wherein after receiving the updated entity data unit, the method further comprises locally storing the updated entity data unit that is received.

5. The method of claim 1, wherein after obtaining the entity data unit, the method further comprises parsing the entity data unit to determine the attribute information or the name information of the entity data unit.

6. The method of claim 1, wherein determining the user group information of the first user comprises at least one of:

after obtaining the entity data unit, establishing a correspondence relationship between the user information of the first user and the attribute information of the entity data unit, and determining the user group information of the first user based on the attribute information of the entity data unit; or after obtaining the entity data unit posted by the first user, establishing a correspondence relationship between the user information of the first user and the name information of the entity data unit, and determining the user group information of the first user based on the name information of the entity data unit.

7. The method of claim 1, wherein matching the conversation information generated between the second user and the first user through the instant messaging client with the entity data unit, comprises:

obtaining the conversation information generated between the second user and the first user through the instant messaging client;

determining whether the conversation information comprises the attribute information or the name information of the entity data unit corresponding to the user information of the first user; and when a determination result indicates that the conversation information comprises the attribute information or the name information of the entity data unit corresponding to the user information of the first user, establishing a correspondence relationship between the user information of the second user corresponding to the conversation information and the attribute information or the name information of the entity data unit corresponding to the user information of the first user.

8. The method of claim 1, wherein determining the user group information of the first user comprises:

determining attribute information or name information corresponding to the user information of the second user based on a correspondence relationship between the user information of the second user corresponding to the conversation information and the attribute information or the name information of the entity data unit corresponding to the user information of the first user;

searching for the user group information of the first user corresponding to the attribute information or the name information of the entity data unit based on the determined attribute information or name information corresponding to the user information of the second user; and upon finding the user group information of the first user corresponding to the attribute information or the name information of the entity data unit, determining an association relationship between the user information of the second user and the found user group information of the first user.

9. The method of claim 1, further comprising:

determining attribute information or name information corresponding to the user information of the second user based on a correspondence relationship between the user information of the second user corresponding to the conversation information and the attribute information or the name information of the entity data unit corresponding to the user information of the first user;

searching for the user group information of the first user corresponding to the attribute information or the name information of the entity data unit based on the determined attribute information or name information corresponding to the user information of the second user; and when the user group information of the first user corresponding to the attribute information or the name information of the entity data unit is not found, generating the user group information of the first user based on the attribute information or the name information of the entity data unit.

10. The method of claim 9, wherein determining the user group information of the first user comprises determining an association relationship between the user information of the second user corresponding to the conversation information and the generated user group information of the first user.

11. The method of claim 1, further comprising loading the user information of the second user into a group corresponding to the user group information of the first user.

12. One or more non-transitory computer-readable media storing executable instructions that, when executed by one or more processors, cause the one or more processors to perform acts comprising:

obtaining, by an instant messaging server, an entity data unit posted by a first user from a target database;

matching conversation information generated between a second user and the first user through an instant messaging client with the entity data unit;

determining user group information of the first user based on a matching result, wherein user information of the second user corresponding to the conversation information belongs to the user group information of the first user, wherein the user group information of the first user is determined according to attribute information or name information of the entity data unit posted by the first user;

classifying the user information of the second user based on the user group information of the first user;

receiving a synchronization response message that is returned from the target database, wherein the synchronization response message is used for indicating whether the entity data unit posted by the first user is updated;

determining whether the synchronization response message includes an updated entity data unit; and upon determining that the synchronization response message does not include the updated entity data unit, reading the entity data unit posted by the first user from a local cache.

13. The one or more non-transitory computer-readable media of claim 12, the acts further comprising:

receiving a login request message from the first user, wherein the login request message comprises user information of the first user;

performing a validity check on the user information of the first user;

when the validity check is successfully passed, sending a synchronization request message of the entity data unit to the target database, wherein the synchronization request message comprises the user information of the first user; and receiving a synchronization response message that is returned from the target database, wherein the synchronization response message is used for indicating whether the entity data unit posted by the first user is updated.

14. The one or more non-transitory computer-readable media of claim 12, the acts further comprising:

upon determining that the synchronization response message includes the updated entity data unit, receiving the updated entity data unit.

15. The one or more non-transitory computer-readable media of claim 14, the acts further comprising locally storing the updated entity data unit that is received.

16. The one or more non-transitory computer-readable media of claim 12, the acts further comprising loading the user information of the second user into a group corresponding to the user group information of the first user.

17. An apparatus comprising:
one or more processors;
memory;

an acquisition module stored in the memory and executable by the one or more processors that is used for obtaining an entity data unit posted by a first user from a target database, the acquisition module further used for:

receiving a synchronization response message that is returned from the target database, wherein the synchronization response message is used for indicating whether the entity data unit posted by the first user is updated, determining whether the synchronization response message includes an updated entity data unit, upon determining that the synchronization response message includes the updated entity data unit, receiving the updated entity data unit; and upon determining that the synchronization response message does not include the updated entity data unit, reading the entity data unit posted by the first user from a local cache;

a determination module stored in the memory and executable by the one or more processors that is used for determining attribute information or name information of the entity data unit that is posted by the first user, the attribute information or name information of the entity data unit including conversation information between the first user and a second user;

a user group information generation module stored in the memory and executable by the one or more processors that is used for generating user group information of the first user corresponding to one or more of the attribute information and the name information based at least in part on one or more of the attribute information and the name information of the entity data unit; and a classification module stored in the memory and executable by the one or more processors that is used for classifying user information of the second user based on the user group information of the first user.

18. The apparatus of claim 17, further comprising a relationship establishment module stored in the memory and executable by the one or more processors that is used for:

establishing a first correspondence relationship between the attribute information of the entity data unit, the user group information of the first user corresponding to the attribute information, and user information of the first user; and establishing a second correspondence relationship between the name information of the entity data unit, the user group information of the first user corresponding to the name information, and the user information of the first user.

19. The apparatus of claim 18, wherein the user information of the first user comprises account information with which the first user logs in an instant messaging server, or an instant messaging identifier with which the user logs in to an instant messaging client.

20. The apparatus of claim 17, wherein the user group information comprises category information.

* * * * *